United States Patent
Wang

(10) Patent No.: US 12,289,790 B2
(45) Date of Patent: Apr. 29, 2025

(54) MEASUREMENT CONFIGURATION PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 490 days.

(21) Appl. No.: 17/475,860

(22) Filed: Sep. 15, 2021

(65) Prior Publication Data

US 2022/0022106 A1    Jan. 20, 2022

Related U.S. Application Data

(63) Continuation of application No. PCT/CN2019/079920, filed on Mar. 27, 2019.

(51) Int. Cl.
*H04W 76/30* (2018.01)
*H04W 36/00* (2009.01)
*H04W 36/08* (2009.01)

(52) U.S. Cl.
CPC ......... *H04W 76/30* (2018.02); *H04W 36/085* (2023.05); *H04W 36/0058* (2018.08); *H04W 36/00835* (2018.08)

(58) Field of Classification Search
CPC ..... H04W 24/08; H04W 76/30; H04W 36/08; H04W 36/58; H04W 24/10; H04W 76/27;

(Continued)

(56) References Cited

U.S. PATENT DOCUMENTS 9,807,636 B2    10/2017   Lee et al.
10,531,326 B2 *  1/2020   Hong ................... H04W 72/23
(Continued)

FOREIGN PATENT DOCUMENTS

CN    1839652 A      9/2006
CN    104427559 A    3/2015
CN    109309969 A    2/2019

OTHER PUBLICATIONS

Nokia et al. (3GPP TSG-RAN WG2 Meeting #102 R2-1806772, May 25, 2018 "Finalizing IDLE Mode Measurements for euCA" (Year: 2018).*

(Continued)

*Primary Examiner* — Oussama Roudani
(74) *Attorney, Agent, or Firm* — PERKINS COIE LLP

(57) ABSTRACT

Provided are a measurement configuration processing method, a terminal device, a network device, a chip, a computer-readable storage medium, a computer program product and a computer program. The method includes that: cell reselection from a first area where a first frequency is located to a second area is performed; and at least a measurement configuration corresponding to the first frequency in an idle measurement configuration is processed. The idle measurement configuration includes a measurement configuration corresponding to at least one frequency. One or more frequencies in the at least one frequency may correspond to one validity area, and one or more validity areas may correspond to one timer. The first frequency is one of the one or more frequencies.

18 Claims, 5 Drawing Sheets

Cell reselection from a first area where a first frequency point is located to a second area is performed — 21

At least a measurement configuration corresponding to the first frequency in an idle measurement configuration is processed — 22

(58) Field of Classification Search
CPC ............. H04W 48/12; H04W 36/0072; H04W 36/0058; H04W 48/20; H04W 36/085; H04W 36/00835; H04W 76/15; H04W 48/16; Y02D 30/70; H04L 5/001; H04L 5/0098

See application file for complete search history.

(56) References Cited

U.S. PATENT DOCUMENTS

| | | | |
|---|---|---|---|
| 2011/0195668 | A1 | 8/2011 | Lee |
| 2012/0015657 | A1* | 1/2012 | Comsa .................. H04L 5/0048 455/456.6 |
| 2012/0263145 | A1* | 10/2012 | Marinier ............... H04W 72/23 370/331 |
| 2013/0010631 | A1* | 1/2013 | Jung ...................... H04W 16/18 370/252 |
| 2014/0242974 | A1* | 8/2014 | Lee ....................... H04W 76/27 455/422.1 |
| 2015/0373573 | A1 | 12/2015 | Lee et al. |
| 2019/0037425 | A1 | 1/2019 | Hong et al. |
| 2021/0345144 | A1* | 11/2021 | Yang ..................... H04W 24/10 |

OTHER PUBLICATIONS

OPPO (3GPP TSG-RAN2 Meeting #102 R2-1806708, May 21-25, 2018 "Further Discussion on UE behaviour for Idle Mode Measurement with Validity Area".*

Huawei et al. "Early measurement configuration/reporting in LTE and NR RRC_IDLE", 3GPP TSG-RAN WG2 Meeting#105 R2-1901612, Athens, Greece, Feb. 25-Mar. 1, 2019. 3 pages.
OPPO, "Further Discussion on UE behaviour for Idle Mode Measurement with Validity Area", 3GPP TSG-RAN2 Meeting #102 R2-1806708, Busan, Korea, May 21-25, 2018. 4 pages.
Supplementary European Search Report in the European application No. 19921495.8, mailed on Feb. 16, 2022. 10 pages.
Written Opinion of the International Search Authority in the international application No. PCT/CN2019/079920, mailed on Dec. 24, 2019. 7 pages with English translation.
ZTE Corporation et al. "Early measurement reporting for RRC idle and inactive state", 3GPP TSG-RAN WG2 Meeting#105 R2-1900801, Athens, Greece, Feb. 25-Mar. 1, 2019. 7 pages.
First Office Action of the Chinese application No. 202111651070.X, issued on Jan. 11, 2023. 17 pages with English translation.
First Office Action of the European application No. 19921495.8, issued on Mar. 6, 2023. 11 pages.
Second Office Action of the Chinese application No. 202111651070.X, issued on Apr. 9, 2023. 15 pages with English translation.
Nokia, "Finalizing IDLE Mode Measurements for euCA", 3GPP TSG-RAN WG2 Meeting # 102 R2-1806772, May 25, 2018 (Mat 25, 2018), sections 1-3.
Vivo, "Report of Email Discussion [100#42][LTE/euCA] Introducing Valid Area Mechanism", 3GPP TSG-RAN WG2 #101bis R2-1804681, Apr. 5, 2018 (Apr. 5, 2018), section 1-3.
International Search Report in International Application No. PCT/CN2019/079920, mailed on Dec. 24, 2019.
Second Office Action of the European application No. 19921495.8, issued on Sep. 14, 2023. 7 pages.

* cited by examiner

MEASUREMENT CONFIGURATION PROCESSING METHOD, TERMINAL DEVICE AND NETWORK DEVICE

CROSS-REFERENCE TO RELATED APPLICATION

This application is a continuation of International Patent Application No. PCT/CN2019/079920 filed on Mar. 27, 2019, the content of which is herein incorporated by reference in its entirety.

TECHNICAL FIELD

The disclosure relates to the technical field of information processing, and particularly to a measurement configuration processing method, a terminal device, a network device, a computer storage medium, a chip, a computer-readable storage medium, a computer program product and a computer program.

BACKGROUND

In Long Term Evolution (LTE) Release 15 (R15), an idle measurement configuration may be configured in a Radio Resource Control (RRC) release message, and an idle measurement configuration may also be configured in a system broadcast. In addition, the idle measurement configuration in the system broadcast has no valid time limits. In dedicated signaling, an idle measurement configuration is configured, and a valid time configuration, i.e., T331, is also configured. When a timer, i.e., T331, expires or stops, the idle measurement configuration configured in the dedicated signaling may be released. However, in such a processing manner, the effectiveness and reasonability of processing an idle measurement configuration cannot be ensured.

SUMMARY

For solving the foregoing technical problem, embodiments of the disclosure provide a measurement configuration processing method, a terminal device, a network device, a computer storage medium, a chip, a computer-readable storage medium, a computer program product and a computer program.

A first aspect provides a measurement configuration processing method, which may be implemented by a terminal device in an idle state or an active state and include that:
  cell reselection from a first area where a first frequency is located to a second area is performed; and
  at least a measurement configuration corresponding to the first frequency in an idle measurement configuration is processed.

The idle measurement configuration includes a measurement configuration corresponding to at least one frequency. One or more frequencies in the at least one frequency may correspond to one validity area, and one or more validity areas may correspond to one timer. The first frequency may be one of the one or more frequencies.

A second aspect provides a measurement configuration processing method, which may be implemented by a network device and include that:
  an idle measurement configuration is configured for a terminal device.

The idle measurement configuration includes a measurement configuration corresponding to at least one frequency. One or more frequencies in the at least one frequency may correspond to one validity area, and one or more validity areas may correspond to one timer.

A third aspect provides a terminal device, which includes a first processing unit.

The first processing unit may perform cell reselection from a first area where a first frequency is located to a second area and process at least a measurement configuration corresponding to the first frequency in an idle measurement configuration.

The idle measurement configuration includes a measurement configuration corresponding to at least one frequency. One or more frequencies in the at least one frequency may correspond to one validity area, and one or more validity areas may correspond to one timer. The first frequency may be one of the one or more frequencies.

A fourth aspect provides a network device, which includes a second communication unit.

The second communication unit may configure an idle measurement configuration for a terminal device.

The idle measurement configuration includes a measurement configuration corresponding to at least one frequency. One or more frequencies in the at least one frequency may correspond to one validity area, and one or more validity areas may correspond to one timer.

A fifth aspect provides a terminal device, which includes a processor and a memory. The memory may be configured to store a computer program, and the processor may be configured to call and run the computer program stored in the memory to execute the method in the first aspect or each implementation mode thereof.

A sixth aspect provides a network device, which may include a processor and a memory. The memory may be configured to store a computer program, and the processor may be configured to call and run the computer program stored in the memory to execute the method in the second aspect or each implementation mode thereof.

A seventh aspect provides a chip, which may be configured to implement the method in any one of the first aspect and the second aspect or each implementation mode thereof.

Specifically, the chip may include a processor, configured to call and run a computer program in a memory to enable a device installed with the chip to execute the method in any one of the first aspect and the second aspect or each implementation mode thereof.

An eighth aspect provides a computer-readable storage medium, which may be configured to store a computer program, the computer program causing a computer to execute the method in any one of the first aspect and the second aspect or each implementation mode thereof.

A ninth aspect provides a computer program product, which may include a computer program instruction, the computer program instruction causing a computer to execute the method in any one of the first aspect and the second aspect or each implementation mode thereof.

A tenth aspect provides a computer program, which may run in a computer to cause the computer to execute the method in any one of the first aspect and the second aspect or each implementation mode thereof.

With adoption of the solutions, at least a measurement configuration for a first frequency in an idle measurement configuration may be processed during cell reselection of a terminal device from an area to a second area. In such a manner, the problem of resource waste caused by releasing the whole idle measurement configuration every time when cell reselection is performed in a conventional art can be solved, and reasonable and effective existence of a measurement configuration can be ensured.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1A:
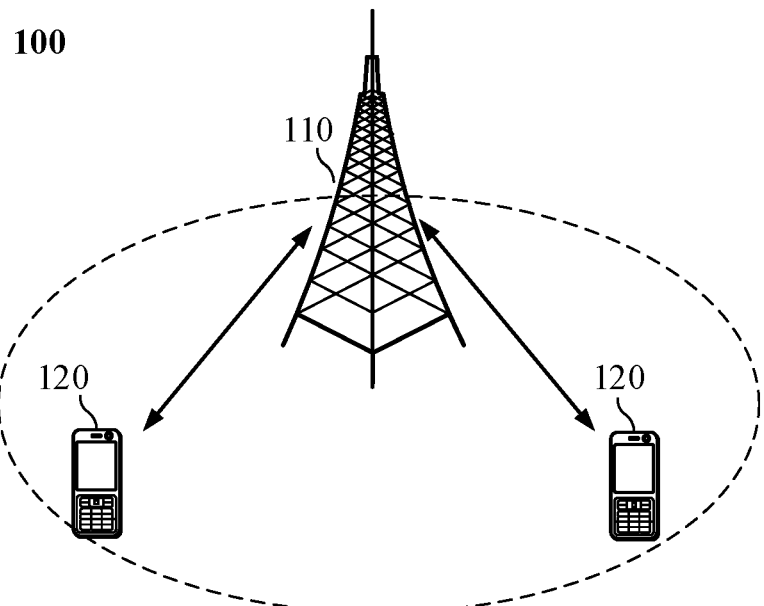
FIG. 1A is a first schematic diagram of an architecture of a communication system according to an embodiment of the disclosure.

Exemplarily, a communication system 100 that the embodiments of the disclosure are applied to may be as shown in FIG. 1A. The communication system 100 may include a network device 110, and the network device 110 may be a device communicating with a terminal device 120 (or called a communication terminal and a terminal). The network device 110 may provide a communication coverage for a specific geographical region and may communicate with a terminal device located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. The "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/ or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal" or a "mobile terminal."

Optionally, the terminal device 120 may perform Device to Device (D2D) communication.

Optionally, the 5G system or the 5G network may also be called a New Radio (NR) system or an NR network.

Figure 1B:
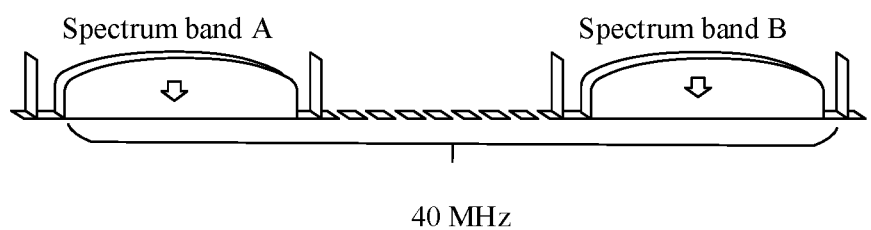
FIG. 1B and FIG. 1C are schematic diagrams of Carrier Aggregation (CA).
Figure 1C:
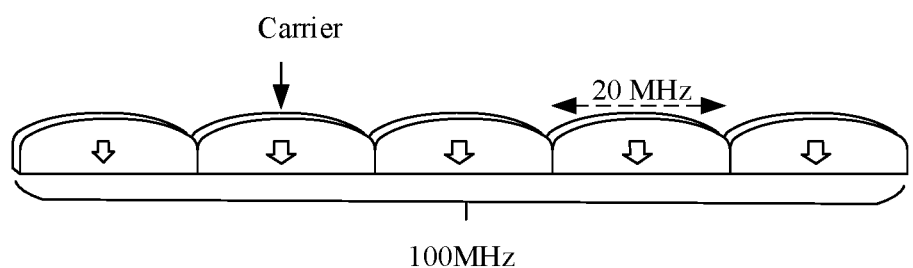

For meeting a requirement on high rate, 5G also supports a CA technology. As shown in FIG. 1B and FIG. 1C, CA refers to jointly scheduling and using resources on multiple Component Carriers (CCs) to enable an NR system to support a greater bandwidth and thus achieve a higher system peak rate. According to the continuity of aggregated carriers on spectrums, CA may be divided into continuous CA and discontinuous CA. According to whether bands where aggregated carriers are located are the same or not, CA is divided into intra-band CA and inter-band CA.

A Primary Cell Component (PCC) is called a primary carrier, a Secondary Cell Component (SCC) is called a secondary carrier, and the SCC only provides an additional radio resource. PCC and SCC are collectively referred to as serving cell. It is also specified in a standard that at most five carriers are supported to be aggregated, namely a bandwidth after aggregation is maximally 100 MHZ, and the aggregated carriers belong to the same base station. All the aggregated carriers use the same Cell Radio Network Temporary Identifier (C-RNTI), and the base station ensures that the C-RNTI does not conflict in cells where each carrier is located. Since asymmetric CA and symmetric CA are supported, aggregated carriers are required to include downlink carriers, and may include no Uplink (UL) carriers. Moreover, a primary carrier cell is required to have its own Physical Downlink Control Channel (PDCCH) and Physical Uplink Control Channel (PUCCH), only the primary carrier cell has the PUCCH, and another secondary carrier cell may have a PDCCH.

A Secondary Cell (SCell) is configured through RRC dedicated signaling, an initially configured state is a deactivated state, and no data may be sent and received in this state. Then, the SCell may be activated through a Media Access Control (MAC) Control Element (CE) to send and receive data. From the prospective of a latency of configuration and activation of the SCell, this architecture is not the best. This latency reduces use of CA and the efficiency of radio resources, particularly for a small cell deployment scenario. In a dense small cell deployment scenario, a signaling load of each SCell is high, particularly under the condition that each SCell is required to be configured independently. Therefore, an additional latency is introduced to the present CA architecture, use of CA is restricted, and the load sharing gain of CA is reduced.

Therefore, CA is optimized in LTE R15. The following main functions are optimized.

User Equipment (UE) measurements in a IDLE mode: an idle measurement configuration may be configured in an RRC release message, and an idle measurement configuration may also be configured in a system broadcast, i.e., System Information Block 5 (SIB5). A dedicated configuration may be used if configured, otherwise the measurement configuration in SIB5 may be used. In addition, the idle measurement configuration in SIB has no valid time limits. In dedicated signaling, an idle measurement configuration may be configured, and a valid time configuration, i.e., T331, may be also configured. When T331 expires or stops, the idle measurement configuration configured in the dedicated signaling may be released, and whether UE continues to use the idle measurement configuration in SIB5 or not is determined by the UE.

After acquiring the idle measurement configuration, the UE may perform measurement, indicate the existence of an idle measurement result to a network side via a UL message, and then report the result based on a request of a base station. Meanwhile, a cell may also broadcast via SIB2 whether reporting of the idle measurement result is supported or not.

Figure 1D:
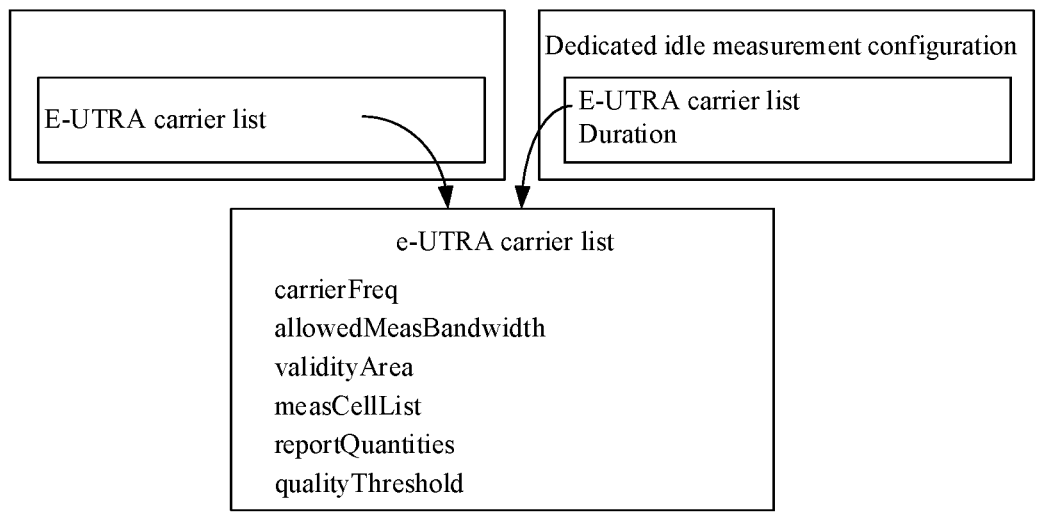
FIG. 1D is a schematic diagram of idle measurement configuration information.
Figure 1E:
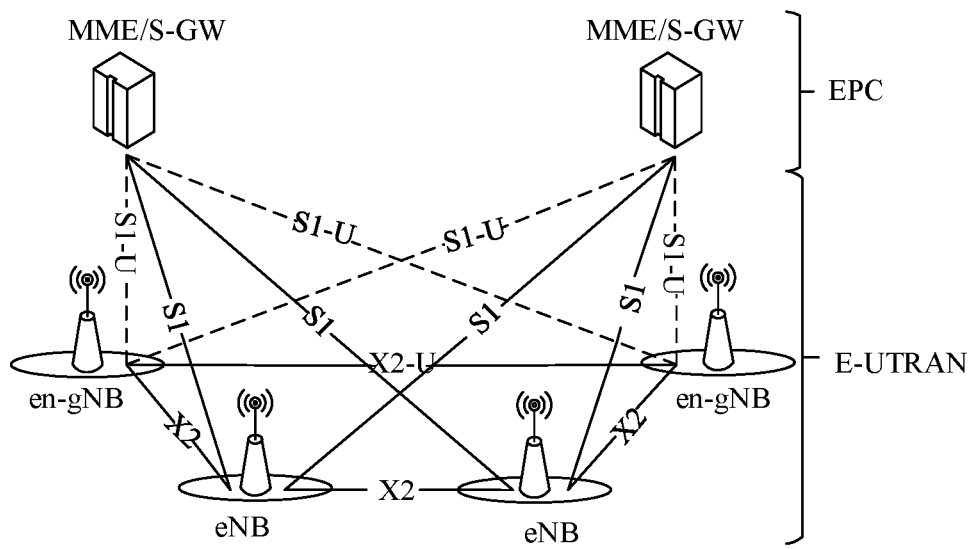
FIG. 1E, FIG. 1F and FIG. 1G are schematic diagrams of a Dual Connectivity (DC) architecture.
Figure 1F:
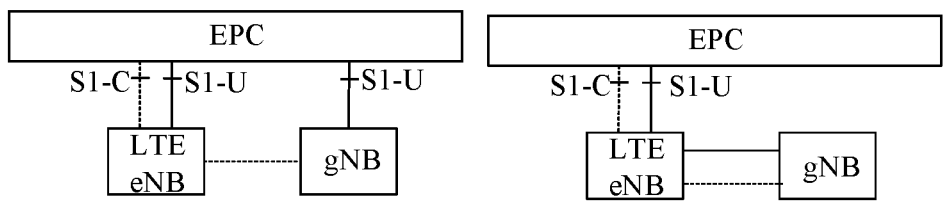
Figure 1G:
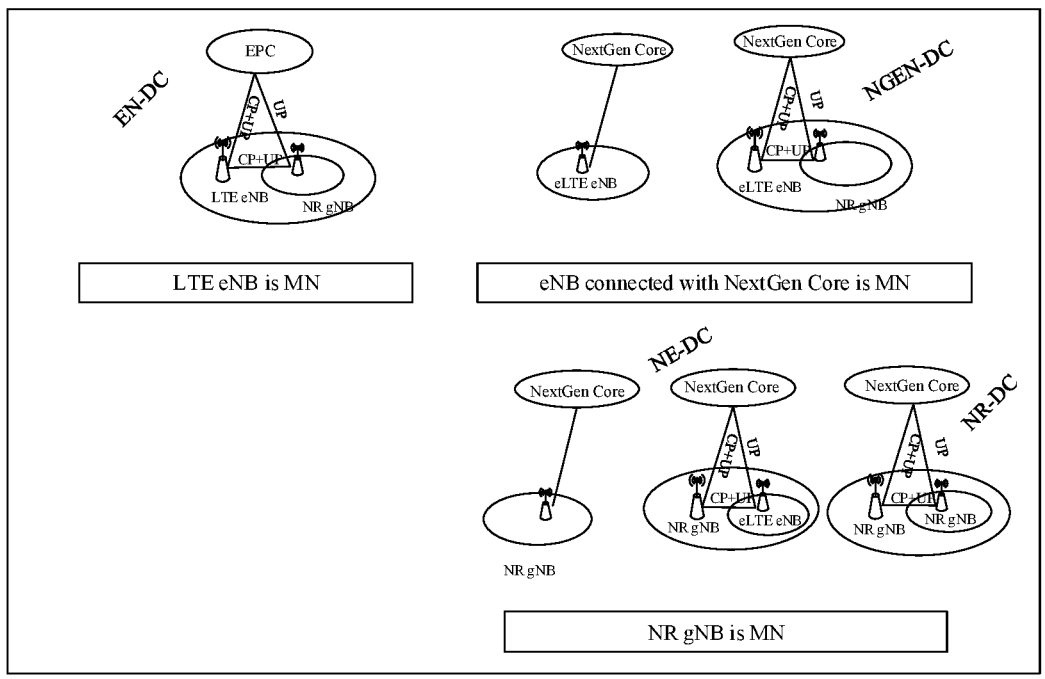

The function of configuring measurement in an idle state to enable the UE to perform measurement and report the measurement result to the network side after the UE enters a connected state is called "idle measurement reporting". Idle measurement configuration information is shown in FIG. 1D. carrierFreq and allowedMeasBandwidth indicate a measured frequency and a measurement bandwidth, and validityArea configures a validity range of the idle measurement configuration and is a cell list. If UE reselects a cell outside the validityArea, the timer T331 may stop. measCellList presents cells reported by the measurement configuration, and other cells are not required to be reported. If the measCellList is not configured, the UE may report measurement reports of at most maxCellMeasIdle cells meeting qualityThreshold. A reported measurement quantity is specified by reportQuantities.

Idle measurement reporting may enable the network side to know about a channel environment of UE faster and make a decision about adding of an SCell rapidly to enable the UE to send and receive data using a CA mode to improve the throughput and the system capacity.

A network deployment and networking architecture taking LTE as a Master Node (MN) and taking SN as a Secondary Node (SN) is as shown in FIG. 1E and 1-6. The MN mainly has a RRC control function and may be connected with a control plane of a Core Network (CN). The SN may configure secondary signaling, such as a Signaling Radio Bearer 3 (SRB3), and mainly provides a data transmission function. In later R15, other DC modes can be supported, namely NR-Evolved Universal Terrestrial Radio Access Network (E-UTRAN) (NE)-DC, 5G Core (5GC)-EN-DC and NR DC, as shown in FIG. 1G. For EN-DC, a CN connected with an access network is an Evolved Packet Core (EPV), and a core network connected in another DC mode is a 5GC.

For both configuration of CA and configuration of Multi-Radio Access Technology (RAT) DC (MR-DC), a configuration and activation latency of an SCell and a configuration and activation latency of a Secondary Cell Group (SCG) are required to be reduced to satisfy the improvement of a cell capacity particularly in a small cell deployment scenario.

It is to be understood that terms "system" and "network" in the disclosure may usually be exchanged. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For making the characteristics and technical contents of the embodiments of the disclosure understood in more detail, implementation of the embodiments will be described below in combination with the drawings in detail. The drawings are only adopted for description as references and not intended to limit the embodiments of the disclosure.

Figure 2:
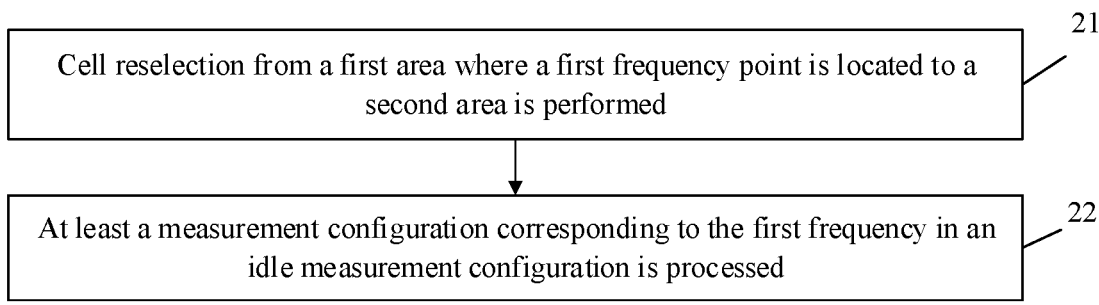
FIG. 2 is a first flowchart of a measurement configuration processing method according to an embodiment of the disclosure.

An embodiment provides a measurement configuration processing method, which is implemented by a terminal device in an idle state or an active state. As shown in FIG. 2, the method includes the following operations.

In 21, cell reselection from a first area where a first frequency is located to a second area is performed.

In 22, at least a measurement configuration corresponding to the first frequency in an idle measurement configuration is processed.

The idle measurement configuration may include a measurement configuration corresponding to at least one frequency. One or more frequencies in the at least one frequency may correspond to one validity area, and one or more validity areas may correspond to one timer. The first frequency may be one of the one or more frequencies.

The solution provided in the implementation mode is described in combination with multiple scenarios.

A First Scenario

The idle measurement configuration includes:
  a measurement configuration corresponding to each frequency in the at least one frequency, and a validity area corresponding to each frequency in the at least one frequency.

At first, it is to be pointed out that, in the scenario, a measurement configuration is required to be acquired. Specifically, an idle measurement configuration may be acquired through a system broadcast or RRC dedicated signaling.

For example, a measurement configuration, configured for the terminal device through an RRC release message, in the idle state and/or the inactive state is called an idle measurement configuration.

Specifically, the idle measurement configuration includes measurement configurations for multiple frequencies. The measurement configuration corresponding to each frequency may include contents such as a frequency required to be measured, a measurement bandwidth, a validity area for the frequency, and a cell list reported by the measurement configuration.

Descriptions are made below with the condition that the multiple frequencies are at least one frequency in an E-UTRAN and at least one frequency in NR respectively as an example. For example, in an E-UTRAN frequency measurement configuration information list and an NR frequency measurement information list, each piece of E-UTRAN frequency measurement configuration information at least includes the following information:

carrierFreq: a measured frequency of the E-UTRAN;
AllowedMeasBANDWIDTH: a measurement bandwidth of the E-UTRAN;
validityArea: a validity area of the measurement configuration;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:

carrierFreq: a measured NR frequency;
frequencyBandList: a band list of the measured NR frequency;
absThreshSS-BlocksConsolidation: a threshold for evaluating cell signal quality;
nrofSS-BlocksToAverage: the maximum number of beams for evaluating the cell signal quality;
smtc: a measurement time window;
ssbSubcarrierSpacing: a subcarrier spacing for Synchronization Signal Blocks (SSBs);
ssb-ToMeasure: a measured SSB index set;
deriveSSB-IndexFromCell: an instruction of acquiring an SSB index of a neighbor cell through an SSB index of a serving cell;
validityArea: a validity area of the measurement configuration;
measCellList: a cell list reported by the measurement configuration;
reportQuantities: a measurement quantity reported by measurement; and
qualityThreshold: a measurement reporting threshold.

In the scenario, the condition that all frequencies in the at least one frequency correspond to one timer and the condition that each frequency in all the frequency corresponds to one timer are described respectively. When all the frequencies correspond to the same timer, the timer is a global timer.

A first condition: the idle measurement configuration further includes a global timer corresponding to the at least one frequency.

Correspondingly, the operation that at least the measurement configuration corresponding to the first frequency in the idle measurement configuration is processed may include that:
the measurement configuration corresponding to the first frequency is released, the global timer is kept running, and a measurement configuration corresponding to other frequency than the first frequency is maintained.

That is, in the case of the use of the global timer, if the terminal device performs cell reselection to an area outside of the area for the frequency, the terminal device may release the measurement configuration corresponding to the first frequency, keep running the timer, and maintain the measurement configuration corresponding to other frequency.

A second condition: the idle measurement configuration further includes a timer respectively corresponding to each frequency in the at least one frequency.

Correspondingly, the operation that at least the measurement configuration corresponding to the first frequency in the idle measurement configuration is processed may include that:
a first timer corresponding to the first frequency is stopped, the measurement configuration corresponding to the first frequency is released, a measurement configuration corresponding to other frequency than the first frequency is maintained, and a state of other timer corresponding to the other frequency is kept.

Under the condition that different frequencies correspond to different timers, processing may be performed using each timer respectively corresponding to each frequency. All the timers corresponding to the different frequencies may be T331 or similar timers. However, time lengths of the timers corresponding to different frequencies may be different, and of course, may also be partially the same or partially different. The conditions are not exhausted here.

That is, for the first frequency in multiple frequencies, when the terminal device moves out of an area of the first frequency, the timer for the first frequency, for example, T331 corresponding to the first frequency, may be stopped. After the timer for the first frequency is stopped, the measurement configuration corresponding to the first frequency may be deleted. In such a case, the timers and measurement configurations for other frequencies are not influenced.

A Second Scenario

The idle measurement configuration may include a global timer and a global validity area corresponding to the at least one frequency.

That is, the difference from the abovementioned scenario is that, in this scenario, a same global validity area is configured for all the frequencies, namely all the frequencies correspond to the same validity area, and a same timer is configured for all the frequencies. The timer can be understood as a global timer.

A manner for acquiring the idle measurement configuration is the same as that described above, and elaborations thereof are omitted here.

In the scenario, the acquired idle measurement configuration may also include the measurement configuration corresponding to each frequency in the multiple frequencies. However, the measurement configuration corresponding to each frequency does not include a validity area for the frequency, and instead, a same global validity area in the idle measurement configuration may be sent. Moreover, each frequency has no corresponding timer, and instead, all the frequencies correspond to a same global timer.

Descriptions are still made with the condition that the measurement configuration includes an E-UTRAN frequency measurement configuration information list and an NR frequency measurement information list as an example.

Each piece of E-UTRAN frequency measurement configuration information includes, but not limited to, the following information:

carrierFreq: a measured frequency of the E-UTRAN;
AllowedMeasBANDWIDTH: a measurement bandwidth of the E-UTRAN;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:

carrierFreq: a measured NR frequency;
frequencyBandList: a band list of the measured NR frequency;
absThreshSS-BlocksConsolidation: a threshold for evaluating cell signal quality;
nrofSS-BlocksToAverage: the maximum number of beams for evaluating the cell signal quality;
smtc: a measurement time window;
ssbSubcarrierSpacing: a subcarrier spacing for SSBs;
ssb-ToMeasure: a measured SSB index set;
deriveSSB-IndexFromCell: an instruction of acquiring an SSB index of a neighbor cell through an SSB index of a serving cell;
measCellList: a cell list reported by the measurement configuration;
reportQuantities: a measurement quantity reported by measurement; and
qualityThreshold: a measurement reporting threshold.

The idle measurement configuration includes the following contents for all the frequencies:
NR frequency list: an NR frequency list;
E-UTRAN frequency list: an E-UTRAN frequency list; and
validityArea: the global validity area for all the frequencies.

In the scenario, the operation that at least the measurement configuration corresponding to the first frequency in the idle measurement configuration is processed may include that:
the global time is stopped, and the idle measurement configuration is released; or
the global time is kept running, and the idle measurement configuration is maintained; or
the global time is suspended, and the idle measurement configuration is released.

It is to be pointed out that, in the embodiment, cell reselection from the first area where the first frequency is located to the second area is performed. The first frequency can be understood as any frequency in the idle measurement configuration. The first area is the global validity area. The second area is other area than the global validity area.

After the operation that the global timer is kept running and the idle measurement configuration is maintained, the method may further include that:
in response to reentering the global validity area before the global timer expires, measurement is re-performed based on the idle measurement configuration.

After the operation that the global timer is suspended and the idle measurement configuration is released, the method may further include that:
in response to reentering the global validity area, measurement is re-performed based on the idle measurement configuration, and the global timer is continued to be run.

Specifically, when cell reselection from the global validity area to a cell outside the global validity area is performed for the global validity area in the idle measurement configuration, one of the following operations is executed, including:
a measurement configuration validity timer is stopped, and the measurement configuration is released; or
measurement is stopped, but the measurement configuration is maintained, and if the global validity area where the at least one frequency is located, indicated in the idle measurement configuration, is reentered before the timer expires, measurement for the measurement configuration is restarted; or
measurement is stopped, the global timer of the measurement configuration is suspended, the measurement configuration is maintained, and if the global validity area where the at least one frequency is located, indicated in the idle measurement configuration, is reentered, measurement for the measurement configuration is restarted.

A Third Scenario

The idle measurement configuration includes a global timer and a group area corresponding to each frequency group in at least one frequency group.

The difference from between the scenario and the two abovementioned scenarios is that, in this scenario, processing may be performed not by taking an independent frequency as a unit but by setting multiple frequencies as a frequency group. That is, multiple frequencies in the at least one frequency form a frequency group, and the group areas are set by taking a frequency group as a unit, namely each frequency group corresponds to a validity area. In addition, in this scenario, a same timer may be adopted for all the frequencies, and the timer can also be understood as a global timer.

A manner for acquiring the idle measurement configuration is the same as that described above, and elaborations thereof are omitted here. However, specific contents in the idle measurement configuration are different. The idle measurement configuration includes a measurement configuration corresponding to each frequency and a group area for at least one frequency group, namely the frequency group shares the same validity area, and different frequencies correspond to different group areas. Here, being different may refer to that areas partially overlap or completely do not overlap.

In addition, the same timer, i.e., the global timer, is configured for all frequency groups.

A manner of dividing part of frequencies in the at least one frequency into a same frequency group may be dividing according to network types corresponding to the frequencies. For example, frequencies of the E-UTRAN may be divided into a frequency group, and NR frequencies may be divided into other frequency group. Of course, more frequency group division manners may be adopted, and will not be exhausted in the scenario.

Descriptions are made below with inclusion of an E-UTRAN frequency measurement configuration information list and an NR frequency measurement information list as an example. Each piece of E-UTRAN frequency measurement configuration information includes, but not limited to, the following information:
carrierFreq: a measured frequency of the E-UTRAN;
AllowedMeasBANDWIDTH: a measurement bandwidth of the E-UTRAN;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:
carrierFreq: a measured NR frequency;
frequencyBandList: a band list of the measured NR frequency;
absThreshSS-BlocksConsolidation: a threshold for evaluating cell signal quality;
nrofSS-BlocksToAverage: the maximum number of beams for evaluating the cell signal quality;

smtc: a measurement time window;
ssbSubcarrierSpacing: a subcarrier spacing for SSBs;
ssb-ToMeasure: a measured SSB index set;
deriveSSB-IndexFromCell: an instruction of acquiring an SSB index of a neighbor cell through an SSB index of a serving cell;
measCellList: a cell list reported by the measurement configuration;
reportQuantities: a measurement quantity reported by measurement; and
qualityThreshold: a measurement reporting threshold.

The idle measurement configuration includes:
NR frequency list: an NR frequency list;
validityAreaforNRconfig: a group area for an NR frequency group;
E-UTRAN frequency list: an E-UTRAN frequency list;
validityAreaforE-UTRANconfig: a group area for an E-UTRAN frequency group; and
Timer: the global timer.

The operation that at least the measurement configuration corresponding to the first frequency in the idle measurement configuration is processed may include that:
the global timer is stopped, and measurement configurations corresponding to all frequency groups in the idle measurement configuration are released; or
measurement of the frequency group where the first frequency is located is stopped, the measurement configuration corresponding to the frequency group where the first frequency is located is released, and a measurement configuration corresponding to other frequency group than is maintained; or
measurement of the frequency group where the first frequency is located is stopped, the measurement configuration corresponding to the frequency group where the first frequency is located is maintained, and the global timer is kept running; or
measurement of the frequency group where the first frequency is located is stopped, the measurement configuration corresponding to the frequency group where the first frequency is located is maintained, and the global timer is suspended.

After the operation that measurement of the frequency group where the first frequency is located is stopped, the measurement configuration corresponding to the frequency group where the first frequency is located is maintained and the global timer is kept running, the method may further include that:
in response to reentering a group area of the frequency group where the first frequency is located before the global timer expires, measurement is performed using the measurement configuration corresponding to the frequency group where the first frequency is located.

After the operation that measurement of the frequency group where the first frequency is located is stopped, the measurement configuration corresponding to the frequency group where the first frequency is located is maintained and the global timer is suspended, the method may further include that:
the group area of the frequency group where the first frequency is located is reentered, measurement is performed using the measurement configuration corresponding to the frequency group where the first frequency is located, and the global timer is continued to be run.

The operation that cell reselection from the first area where the first frequency is located to the second area is performed may be as follows: reselection from a group area of a first cell group corresponding to the first frequency of the first cell group to other group area than the first cell group is performed.

For example, descriptions are made with regard to an NR frequency group and an E-UTRAN frequency group respectively, where different frequency groups correspond to different group areas. When reselection from the group area of the NR frequency group to the group area for the E-UTRAN frequency group may be performed for the terminal device, one of the following operations may be executed.

A measurement configuration validity timer is stopped, and all measurement configurations are released.

Measurement of the frequency group corresponding to the area is stopped, the measurement configuration corresponding to the frequency group is released, a measurement configuration of other frequency group is maintained, and corresponding measurement is continued to be performed.

Measurement of the frequency group corresponding to the area is stopped, but the measurement configuration corresponding to the frequency group is maintained, the timer is kept running, and if the validity area is reentered before the timer expires, measurement for the measurement configuration may be restarted.

Measurement of the frequency group corresponding to the area is stopped, the measurement configuration validity timer is suspended, the measurement configuration is maintained, and if the UE reenters the validity area, measurement for the measurement configuration may be restarted, and the timer may be kept running.

A Fourth Scenario

The idle measurement configuration includes a group timer and a group area respectively corresponding to each frequency group in at least one frequency group.

Like the third scenario, processing for frequency groups is performed in this scenario. The difference from the third scenario is that, in this scenario, no global timer is used, and instead, a group timer is set respectively for each frequency group. That is, each frequency in each frequency group corresponds to a same group timer. Different frequency groups correspond to different group timers. Time lengths of different group timers may be different or the same, or may partially the same or partially different. Exhaustions are omitted here.

A manner of dividing part of frequencies in the at least one frequency into a same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

Descriptions are made below with inclusion of an E-UTRAN frequency measurement configuration information list and an NR frequency measurement information list as an example. Each piece of E-UTRAN frequency measurement configuration information includes, but not limited to, the following information:

Each piece of E-UTRAN frequency measurement configuration information includes, but not limited to, the following information:
carrierFreq: a measured frequency of the E-UTRAN;
AllowedMeasBANDWIDTH: a measurement bandwidth of the E-UTRAN;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:

carrierFreq: a measured NR frequency;

frequencyBandList: a band list of the measured NR frequency;

absThreshSS-BlocksConsolidation: a threshold for evaluating cell signal quality;

nrofSS-BlocksToAverage: the maximum number of beams for evaluating the cell signal quality;

smtc: a measurement time window;

ssbSubcarrierSpacing: a subcarrier spacing for SSBs;

ssb-ToMeasure: a measured SSB index set;

deriveSSB-IndexFromCell: an instruction of acquiring an SSB index of a neighbor cell through an SSB index of a serving cell;

measCellList: a cell list reported by the measurement configuration;

reportQuantities: a measurement quantity reported by measurement; and qualityThreshold: a measurement reporting threshold.

The idle measurement configuration includes:

NR frequency list: an NR frequency list;

validityAreaforNRconfig: a group area of an NR frequency group;

Timer-NR: like T331 in LTE, a timer group of the NR frequency group;

E-UTRAN frequency list: an E-UTRAN frequency list;

validityAreaforE-UTRANconfig: a group area of an E-UTRAN frequency group; and

Timer-EUTRAN: like T331 in LTE, a timer group of the E-UTRAN.

The operation that at least the measurement configuration corresponding to the first frequency in the idle measurement configuration is processed may include that:

a first group timer of a frequency group where the first frequency is located is stopped, and the measurement configuration corresponding to the frequency group where the first frequency is located is released; or measurement of the frequency group where the first frequency is located is stopped, measurement of the frequency group where the first frequency is located is stopped, the measurement configuration corresponding to the frequency group where the first frequency is located is maintained, and the first group timer of the frequency group where the first frequency is located is kept running; or measurement of the frequency group where the first frequency is located is stopped, the measurement configuration corresponding to the frequency group where the first frequency is located is maintained, and the first group timer of the frequency group where the first frequency is located is suspended.

After the operation that measurement of the frequency group where the first frequency is located is stopped, the measurement configuration corresponding to the frequency group where the first frequency is located is maintained and the first group timer of the frequency group where the first frequency is located is kept running, the method may further include that:

in response to reentering a group area of the frequency group where the first frequency is located before the first group timer of the frequency group where the first frequency is located expires, measurement is performed using the measurement configuration corresponding to the frequency group where the first frequency is located.

After the operation that measurement of the frequency group where the first frequency is located is stopped, the measurement configuration corresponding to the frequency group where the first frequency is located is maintained and the first group timer of the frequency group where the first frequency is located is suspended, the method may further include that:

the group area of the frequency group where the first frequency is located is reentered, measurement is performed using the measurement configuration corresponding to the frequency group where the first frequency is located, and the first group timer of the frequency group where the first frequency is located is continued to be run.

For example, descriptions are made with regard to an NR frequency group and an E-UTRAN frequency group respectively, where different frequency groups correspond to different group areas. When reselection from the group area of the NR frequency group to the group area for the E-UTRAN frequency group may be performed on the terminal device, one of the following operations may be executed.

Measurement of the frequency group corresponding to the area is stopped, a group timer for the frequency group is stopped, and the measurement configuration is released.

Measurement of the frequency group corresponding to the area is stopped, but the measurement configuration is maintained, the group timer for the frequency group is continued to be run, and if the validity area is reentered before the group timer expires, measurement for the measurement configuration may be restarted. A configuration and group timer of other frequency group are not influenced.

Measurement of the frequency group corresponding to the area is stopped, the measurement configuration group timer of the frequency group is suspended, the measurement configuration is maintained, and if the UE reenters the validity area, measurement for the measurement configuration may be restarted, and the group timer for the frequency group may be continued to be run.

Based on the abovementioned solution, at least one of the following operations may be further executed in the implementation mode.

When in an all cells unavailable state, idle measurement is stopped, the timer is stopped, and the idle measurement configuration is released.

When in the all cells unavailable state, idle measurement is stopped, the timer is stopped, and a measurement result is released.

When in the all cells unavailable state, idle measurement is stopped, the timer is run or suspended, and the measurement configuration and the measurement result are maintained.

When residing in an acceptable cell or residing in a cell, idle measurement is stopped, the timer is stopped, and the idle measurement configuration is released.

When residing in the acceptable cell or residing in the cell, idle measurement is stopped, the timer is stopped, and the measurement result is released.

When residing in the acceptable cell or residing in the cell, idle measurement is stopped, the timer is run or suspended, and the measurement configuration and the measurement result are maintained.

No matter whether the terminal device is in the idle state or the inactive state after acquiring the idle measurement configuration, the following operations are executed.

When in the all cells unavailable state, namely an any cell selection state, for example, a state that there are no cells at present, measurement is stopped, the timer is stopped, and the measurement configuration and/or the measurement result are/is released.

When in the all cells unavailable state, namely the any cell selection state, measurement is stopped, the timer is run or suspended, and the measurement configuration and/or the measurement result are/is maintained.

When residing in the acceptable cell or residing in any cell, measurement is stopped, the timer is stopped, and the measurement configuration and/or the measurement result are/is released.

When residing in the acceptable cell or residing in any cell, measurement is stopped, the timer is run or suspended, and the measurement configuration and the measurement result are maintained.

That is, when the terminal device is in the all cells unavailable state or resides in any cell, measurement may not be performed according to the idle measurement configuration. Under all these conditions, measurement may be stopped, but the measurement configuration may be maintained, or the measurement configuration may be released. Of course, for a present timer, for example, one of a group timer, a global timer or a timer for a frequency, the presently started timer may be stopped, or may be kept run till automatically stopped, or the timer may also be suspended.

It is also to be pointed out that suspending a timer may refer to halting a timer. That is, no matter what the present length of the timer is, a controller may be controlled to keep its present time length unchanged if the time length does not reach a corresponding time length, and the timer is continued to be run under triggering of a new scenario.

It can be seen that, with adoption of the solution, at least the measurement configuration corresponding to the first frequency in the idle measurement configuration may be processed during cell reselection of the terminal device from an area to the second area. In such a manner, resource waste caused by releasing the whole idle measurement configuration every time when cell reselection is performed in a conventional art may be avoided, and reasonable and effective existence of a measurement configuration may be ensured.

Figure 3:
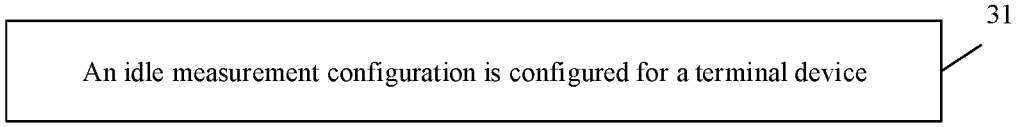
FIG. 3 is a second flowchart of measurement configuration processing according to an embodiment of the disclosure.

Another implementation mode provides a measurement configuration processing method, which is implemented by a network device. As shown in FIG. 3, the method includes the following operations.

In 31, an idle measurement configuration is configured for a terminal device.

The idle measurement configuration includes a measurement configuration corresponding to at least one frequency. One or more frequencies in the at least one frequency may correspond to one validity area, and one or more validity areas may correspond to one timer.

The solution provided in the implementation mode is described in combination with multiple scenarios.

A First Scenario

The idle measurement configuration includes:

a measurement configuration corresponding to each frequency in the at least one frequency, and a validity area corresponding to each frequency in the at least one frequency.

At first, it is to be pointed out that, in the scenario, the measurement configuration is required to be sent. Specifically, the idle measurement configuration may be sent through a system broadcast or RRC dedicated signaling.

For example, a measurement configuration, configured for the terminal device through an RRC release message, in the idle state and/or the inactive state is called an idle measurement configuration.

Specifically, the idle measurement configuration includes measurement configurations for multiple frequencies. The measurement configuration corresponding to each frequency may include contents such as a frequency required to be measured, a measurement bandwidth, a validity area for the frequency, and a cell list reported by the measurement configuration.

Descriptions are made below with the condition that the multiple frequencies are at least one frequency in an E-UTRAN and at least one frequency in NR respectively as an example. For example, in an E-UTRAN frequency measurement configuration information list and an NR frequency measurement information list, each piece of E-UTRAN frequency measurement configuration information at least includes the following information:

carrierFreq: a measured frequency of the E-UTRAN;
AllowedMeasBANDWIDTH: a measurement bandwidth of the E-UTRAN;
validityArea: a validity area of the measurement configuration;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:

carrierFreq: a measured NR frequency;
frequencyBandList: a band list of the measured NR frequency;
absThreshSS-BlocksConsolidation: a threshold for evaluating cell signal quality;
nrofSS-BlocksToAverage: the maximum number of beams for evaluating the cell signal quality;
smtc: a measurement time window;
ssbSubcarrierSpacing: a subcarrier spacing for SSBs;
ssb-ToMeasure: a measured SSB index set;
deriveSSB-IndexFromCell: an instruction of acquiring an SSB index of a neighbor cell through an SSB index of a serving cell;
validityArea: a validity area of the measurement configuration;
measCellList: a cell list reported by the measurement configuration;
reportQuantities: a measurement quantity reported by measurement; and
qualityThreshold: a measurement reporting threshold.

In the scenario, the condition that all frequencies in the at least one frequency correspond to a timer and the condition that each frequency in all the frequency corresponds to a timer are described respectively. When all the frequencies correspond to the same timer, the timer is a global timer.

A first condition: the idle measurement configuration further includes a global timer corresponding to the at least one frequency.

A second condition: the idle measurement configuration further includes a timer respectively corresponding to each frequency in the at least one frequency.

Under the condition that different frequencies correspond to different timers, processing is performed using the timer respectively corresponding to each frequency. All the timers corresponding to the different frequencies may be T331 or similar timers. However, time lengths of the timers corresponding to different frequencies may be different, and of course, may also be partially the same or partially different. The conditions are not exhausted here.

A Second Scenario

In the scenario, the idle measurement configuration includes a global timer and a global validity area corresponding to the at least one frequency.

That is, the difference from the abovementioned scenario is that, in the scenario, a same global validity area is configured for all the frequencies, namely all the frequencies correspond to the same validity area, and a same timer is configured for all the frequencies. The timer can be understood as a global timer.

A manner for sending the idle measurement configuration is the same as that described above, and elaborations thereof are omitted here.

In the scenario, the sent idle measurement configuration may also include the measurement configuration corresponding to each frequency in the multiple frequencies. However, the measurement configuration corresponding to each frequency does not include the validity area for the frequency, and instead, the same global validity area is sent in the idle measurement configuration. Moreover, each frequency has no corresponding timer, and instead, all the frequencies correspond to the global timer.

Descriptions are still made with the condition that the measurement configuration includes an E-UTRAN frequency measurement configuration information list and an NR frequency measurement information list as an example.

Each piece of E-UTRAN frequency measurement configuration information includes, but not limited to, the following information:
  carrierFreq: a measured frequency of the E-UTRAN;
  AllowedMeasBANDWIDTH: a measurement bandwidth of the E-UTRAN;
  measCellList: a cell list reported by the measurement configuration;
  reportQuantities: a measurement quantity reported by measurement; and
  qualityThreshold: a measurement reporting threshold.

Each piece of NR frequency measurement configuration information includes, but not limited to, the following information:
  carrierFreq: a measured NR frequency;
  frequencyBandList: a band list of the measured NR frequency;
  absThreshSS-BlocksConsolidation: a threshold for evaluating cell signal quality;
  nrofSS-BlocksToAverage: the maximum number of beams for evaluating the cell signal quality;
  smtc: a measurement time window;
  ssbSubcarrierSpacing: a subcarrier spacing for SSBs;
  ssb-ToMeasure: a measured SSB index set;
  deriveSSB-IndexFromCell: an instruction of acquiring an SSB index of a neighbor cell through an SSB index of a serving cell;
  measCellList: a cell list reported by the measurement configuration;
  reportQuantities: a measurement quantity reported by measurement; and
  qualityThreshold: a measurement reporting threshold.

The idle measurement configuration includes the following contents for all the frequencies:
  NR frequency list: an NR frequency list;
  E-UTRAN frequency list: an E-UTRAN frequency list; and
  validityArea: the global validity area for all the frequencies.

A Third Scenario

The idle measurement configuration includes a global timer and a group area corresponding to each frequency group in at least one frequency group.

The difference from between the scenario and the two abovementioned scenarios is that, in the scenario, processing is performed not by taking an independent frequency as a unit but by setting multiple frequencies as a frequency group. That is, multiple frequencies in the at least one frequency form a frequency group, and the group areas are set by taking a frequency group as a unit, namely each frequency group corresponds to a validity area. In addition, in the scenario, the same timer is adopted for all the frequencies, and the timer can also be understood as a global timer.

A manner for sending the idle measurement configuration is the same as that described above, and elaborations thereof are omitted here. However, specific contents in the idle measurement configuration are different. The idle measurement configuration includes a measurement configuration corresponding to each frequency and a group area for at least one frequency group, namely the frequency group shares the same validity area, and different frequencies correspond to different group areas. Here, being different may refer to that areas partially overlap or completely do not overlap.

In addition, the same timer, i.e., a global timer, is configured for all frequency groups.

A manner of dividing part of frequencies in the at least one frequency into the same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

Descriptions are made below with inclusion of an E-UTRAN frequency measurement configuration information list and an NR frequency measurement information list as an example. Each piece of E-UTRAN frequency measurement configuration information includes, but not limited to, the following information:
  carrierFreq: a measured frequency of the E-UTRAN;
  AllowedMeasBANDWIDTH: a measurement bandwidth of the E-UTRAN;
  measCellList: a cell list reported by the measurement configuration;
  reportQuantities: a measurement quantity reported by measurement; and
  qualityThreshold: a measurement reporting threshold.

Each piece of NR frequency measurement configuration information includes, but not limited to, the following information:
  carrierFreq: a measured NR frequency;
  frequencyBandList: a band list of the measured NR frequency;
  absThreshSS-BlocksConsolidation: a threshold for evaluating cell signal quality;
  nrofSS-BlocksToAverage: the maximum number of beams for evaluating the cell signal quality;
  smtc: a measurement time window;
  ssbSubcarrierSpacing: a subcarrier spacing for SSBs;
  ssb-ToMeasure: a measured SSB index set;
  deriveSSB-IndexFromCell: an instruction of acquiring an SSB index of a neighbor cell through an SSB index of a serving cell;

measCellList: a cell list reported by the measurement configuration;
reportQuantities: a measurement quantity reported by measurement; and
qualityThreshold: a measurement reporting threshold.

The idle measurement configuration includes:
NR frequency list: an NR frequency list;
validityAreaforNRconfig: a group area for an NR frequency group;
E-UTRAN frequency list: an E-UTRAN frequency list;
validityAreaforE-UTRANconfig: a group area for an E-UTRAN frequency group; and
Timer: the global timer.

A Fourth Scenario

The idle measurement configuration includes a group timer and a group area respectively corresponding to each frequency group in at least one frequency group.

Like the third scenario, processing for frequency groups is performed in the scenario. The difference from the third scenario is that, in the scenario, no global timer is used, and instead, a group timer is set for each frequency group. That is, each frequency in each frequency group corresponds to the same group timer. Different frequency groups correspond to different group timers. Time lengths of different group timers may be different or the same, or may partially the same or partially different. Exhaustions are omitted here.

A manner of dividing part of frequencies in the at least one frequency into the same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

Descriptions are made below with regard to an E-UTRAN frequency measurement configuration information list and an NR frequency measurement information list. Each piece of E-UTRAN frequency measurement configuration information includes, but not limited to, the following information:

Each piece of E-UTRAN frequency measurement configuration information includes, but not limited to, the following information:
carrierFreq: a measured frequency of the E-UTRAN;
AllowedMeasBANDWIDTH: a measurement bandwidth of the E-UTRAN;
measCellList: a cell list reported by the measurement configuration;
reportQuantities: a measurement quantity reported by measurement; and
qualityThreshold: a measurement reporting threshold.

Each piece of NR frequency measurement configuration information includes, but not limited to, the following information:
carrierFreq: a measured NR frequency;
frequencyBandList: a band list of the measured NR frequency;
absThreshSS-BlocksConsolidation: a threshold for evaluating cell signal quality;
nrofSS-BlocksToAverage: the maximum number of beams for evaluating the cell signal quality;
smtc: a measurement time window;
ssbSubcarrierSpacing: a subcarrier spacing for SSBs;
ssb-ToMeasure: a measured SSB index set;
deriveSSB-IndexFromCell: an instruction of acquiring an SSB index of a neighbor cell through an SSB index of a serving cell;
measCellList: a cell list reported by the measurement configuration;
reportQuantities: a measurement quantity reported by measurement; and
qualityThreshold: a measurement reporting threshold.

The idle measurement configuration includes:
NR frequency list: an NR frequency list;
validityAreaforNRconfig: a group area of an NR frequency group;
Timer-NR: like T331 in LTE, a timer group of the NR frequency group;
E-UTRAN frequency list: an E-UTRAN frequency list;
validityAreaforE-UTRANconfig: a group area of an E-UTRAN frequency group; and
Timer-EUTRAN: like T331 in LTE, a timer group of the E-UTRAN.

It can be seen that, with adoption of the solution, at least the measurement configuration corresponding to the first frequency in the idle measurement configuration may be processed during cell reselection of the terminal device from an area to the second area. In such a manner, resource waste caused by releasing the whole idle measurement configuration every time when cell reselection is performed in a conventional art may be avoided, and reasonable and effective existence of a measurement configuration may be ensured.

Figure 4:
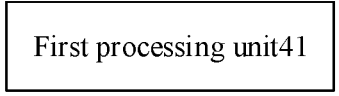
FIG. 4 is a first composition structure diagram of a terminal device according to an embodiment of the disclosure.

An embodiment provides a terminal device, which, as shown in FIG. 4, includes a first processing unit 41.

The first processing unit 41 performs cell reselection from a first area where a first frequency is located to a second area and processes at least a measurement configuration corresponding to the first frequency in an idle measurement configuration.

The idle measurement configuration may include a measurement configuration corresponding to at least one frequency. One or more frequencies in the at least one frequency may correspond to one validity area, and one or more validity areas may correspond to one timer. The first frequency may be one of the one or more frequencies.

The solution provided in the implementation mode is described in combination with multiple scenarios.

A First Scenario

The idle measurement configuration includes:
a measurement configuration corresponding to each frequency in the at least one frequency, and a validity area corresponding to each frequency in the at least one frequency.

Figure 5:
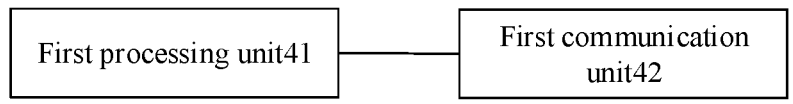
FIG. 5 is a second composition structure diagram of a terminal device according to an embodiment of the disclosure.

At first, it is to be pointed out that, in the scenario, a measurement configuration is required to be acquired. Specifically, as shown in FIG. 5, the terminal device may further include a first communication unit 42, specifically acquiring an idle measurement configuration through a system broadcast or RRC dedicated signaling.

For example, a measurement configuration, configured for the terminal device through an RRC release message, in the idle state and/or the inactive state is called an idle measurement configuration.

Specifically, the idle measurement configuration includes measurement configurations for multiple frequencies. The measurement configuration corresponding to each frequency may include contents such as a frequency required to be measured, a measurement spectrum bandwidth, a validity area for the frequency, and a cell list reported by the measurement configuration.

In the scenario, the condition that all frequencies in the at least one frequency correspond to a timer and the condition that each frequency in all the frequency corresponds to a timer are described respectively. When all the frequencies correspond to the same timer, the timer is a global timer.

A first condition: the idle measurement configuration further includes a global timer corresponding to the at least one frequency.

Correspondingly, the first processing unit 41 may release the measurement configuration corresponding to the first frequency, keeps running the global timer and maintains a measurement configuration corresponding to other frequency than the first frequency.

That is, in the case of the use of the global timer, if the terminal device performs cell reselection to an area the outside of the area for the frequency, the terminal device may release the measurement configuration corresponding to the first frequency, keep running the timer, and maintain the measurement configuration for the other frequency.

A second condition: the idle measurement configuration further includes a timer respectively corresponding to each frequency in the at least one frequency.

Correspondingly, the first processing unit 41 may stop a first timer corresponding to the first frequency, release the measurement configuration corresponding to the first frequency, maintain a measurement configuration corresponding to other frequency than the first frequency and keep a state of other timer corresponding to the other frequency.

Under the condition that different frequencies correspond to different timers, processing is performed using each timer respectively corresponding to each frequency. All the timers corresponding to the different frequencies may be T331 or similar timers. However, time lengths of the timers corresponding to different frequencies may be different, and of course, may also be partially the same or partially different. The conditions are not exhausted here.

That is, for the first frequency in multiple frequencies, if the terminal device moves out of an area of the first frequency, the timer for the first frequency, for example, T331 corresponding to the first frequency, is stopped. After the timer for the first frequency is stopped, the measurement configuration corresponding to the first frequency is deleted. In such a case, the timers and measurement configurations for the other frequencies are not influenced.

A Second Scenario

In the scenario, the idle measurement configuration includes a global timer and a global validity area corresponding to the at least one frequency.

That is, the difference from the abovementioned scenario is that, in the scenario, a same global validity area is configured for all the frequencies, namely all the frequencies correspond to the same validity area, and a same timer is configured for all the frequencies. The timer can be understood as a global timer.

A manner for acquiring the idle measurement configuration is the same as that described above, and elaborations thereof are omitted here.

In the scenario, the acquired idle measurement configuration may also include the measurement configuration corresponding to each frequency in the multiple frequencies. However, the measurement configuration corresponding to each frequency does not include a validity area for the frequency, and instead, a same global validity area is sent in the idle measurement configuration. Moreover, each frequency has no corresponding timer, and instead, all the frequencies correspond to the global timer.

In the scenario, the first processing unit 41 may execute one of:

stopping the global time and releasing the idle measurement configuration;

keeping running the global time and maintaining the idle measurement configuration; and suspending the global time and releasing the idle measurement configuration.

It is to be pointed out that, in the embodiment, cell reselection from the first area where the first frequency is located to the second area is performed. The first frequency can be understood as any frequency in the idle measurement configuration. The first area is the global validity area. The second area is other range than the global validity area.

After the operation that the global timer is kept running and the idle measurement configuration is maintained, the method may further include that:

in response to the terminal device reentering the global validity area before the global timer expires, measurement is re-performed based on the idle measurement configuration.

After the operation that the global timer is suspended and the idle measurement configuration is released, the method may further include that:

in response to the terminal device reentering the global validity area, measurement is re-performed based on the idle measurement configuration, and the global timer is continued to be run.

Specifically, when cell reselection from the global validity area to a cell outside the area is performed for the global validity area in the idle measurement configuration, one of the following operations is executed, including that:

a measurement configuration validity timer is stopped, and the measurement configuration is released;

measurement is stopped, but the measurement configuration is maintained, and if the global validity area where the at least one frequency is located, indicated in the idle measurement configuration, is reentered before the timer expires, measurement for the measurement configuration is restarted; and measurement is stopped, the global timer of the measurement configuration is suspended, the measurement configuration is maintained, and if the global validity area where the at least one frequency is located, indicated in the idle measurement configuration, is reentered, measurement for the measurement configuration is restarted.

A Third Scenario

The idle measurement configuration includes a global timer and a group area corresponding to each frequency group in at least one frequency group.

The difference from between the scenario and the two abovementioned scenarios is that, in the scenario, processing is performed not by taking an independent frequency as a unit but by setting multiple frequencies as a frequency group. That is, multiple frequencies in the at least one frequency form a frequency group, and the group areas are set by taking a frequency group as a unit, namely each frequency group corresponds to a validity area. In addition, in the scenario, the same timer is adopted for all the frequencies, and the timer can also be understood as a global timer.

A manner for acquiring the idle measurement configuration is the same as that described above, and elaborations thereof are omitted here. However, specific contents in the idle measurement configuration are different. The idle measurement configuration includes a measurement configuration corresponding to each frequency and a group area for at least one frequency group, namely the frequency group shares the same validity area, and different frequencies correspond to different group areas. Here, being different may refer to that areas partially overlap or completely do not overlap.

In addition, the same timer, i.e., a global timer, is configured for all frequency groups.

A manner of dividing part of frequencies in the at least one frequency into the same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

The first processing unit 41 may execute one of:
stopping the global timer and releasing measurement configurations corresponding to all frequency groups in the idle measurement configuration;
stopping measurement of the frequency group where the first frequency is located, releasing the measurement configuration corresponding to the frequency group where the first frequency is located, and maintaining a measurement configuration corresponding to other frequency group than;
stopping measurement of the frequency group where the first frequency is located, maintaining the measurement configuration corresponding to the frequency group where the first frequency is located, and keeping running the global timer; and
stopping measurement of the frequency group where the first frequency is located, maintaining the measurement configuration corresponding to the frequency group where the first frequency is located, and suspending the global timer.

After the operation that measurement of the frequency group where the first frequency is located is stopped, the measurement configuration corresponding to the frequency group where the first frequency is located is maintained and the global timer is kept running, the method may further include that:
in response to the terminal device reentering a group area of the frequency group where the first frequency is located before the global timer expires, measurement is performed using the measurement configuration corresponding to the frequency group where the first frequency is located.

After the operation that measurement of the frequency group where the first frequency is located is stopped, the measurement configuration corresponding to the frequency group where the first frequency is located is maintained and the global timer is suspended, the method may further include that:
the group area of the frequency group where the first frequency is located is reentered, measurement is performed using the measurement configuration corresponding to the frequency group where the first frequency is located, and the global timer is continued to be run.

The operation that cell reselection from the first area where the first frequency is located to the second area is performed may be as follows: reselection from a group area of a first cell group corresponding to the first frequency of the first cell group to other group area than the first cell group is performed.

For example, descriptions are made with regard to an NR frequency group and an E-UTRAN frequency group respectively, where different frequency groups correspond to different group areas. When reselection from the group area of the NR frequency group to the group area for the E-UTRAN frequency group may be performed on the terminal device, one of the following operations may be executed.

A measurement configuration validity timer is stopped, and all measurement configurations are released.

Measurement of the frequency group corresponding to the area is stopped, the measurement configuration corresponding to the frequency group is released, a measurement configuration of other frequency group is maintained, and corresponding measurement is continued to be performed.

Measurement of the frequency group corresponding to the area is stopped, but the measurement configuration corresponding to the frequency group is maintained, the timer is kept running, and if the validity area is reentered before the timer expires, measurement for the measurement configuration may be restarted.

Measurement of the frequency group corresponding to the area is stopped, the measurement configuration validity timer is suspended, the measurement configuration is maintained, and if the UE reenters the validity area, measurement for the measurement configuration may be restarted, and the timer may be kept running.

A Fourth Scenario

The idle measurement configuration includes a group timer and a group area respectively corresponding to each frequency group in at least one frequency group.

Like the third scenario, processing for frequency groups is performed in the scenario. The difference from the third scenario is that, in the scenario, no global timer is used, and instead, a group timer is set respectively for each frequency group. That is, each frequency in each frequency group corresponds to a same group timer. Different frequency groups correspond to different group timers. Time lengths of different group timers may be different or the same, or may partially the same or partially different. Exhaustions are omitted here.

A manner of dividing part of frequencies in the at least one frequency into a same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

The first processing unit 41 may execute one of:
stopping a first group timer of a frequency group where the first frequency is located and releasing the measurement configuration corresponding to the frequency group where the first frequency is located;
stopping measurement of the frequency group where the first frequency is located, stopping measurement of the frequency group where the first frequency is located, maintaining the measurement configuration corresponding to the frequency group where the first frequency is located, and keeping running the first group timer of the frequency group where the first frequency is located; and
stopping measurement of the frequency group where the first frequency is located, maintaining the measurement configuration corresponding to the frequency group where the first frequency is located, and suspending the first group timer of the frequency group where the first frequency is located.

After the operation that measurement of the frequency group where the first frequency is located is stopped, the measurement configuration corresponding to the frequency group where the first frequency is located is maintained and the first group timer of the frequency group where the first frequency is located is kept running, the method may further include that:

in response to the terminal device reentering a group area of the frequency group where the first frequency is located before the first group timer of the frequency group where the first frequency is located expires, measurement is performed using the measurement configuration corresponding to the frequency group where the first frequency is located.

After the operation that measurement of the frequency group where the first frequency is located is stopped, the measurement configuration corresponding to the frequency group where the first frequency is located is maintained and the first group timer of the frequency group where the first frequency is located is suspended, the method may further include that:

the group area of the frequency group where the first frequency is located is reentered, measurement is performed using the measurement configuration corresponding to the frequency group where the first frequency is located, and the first group timer of the frequency group where the first frequency is located is continued to be run.

Based on the abovementioned solution, the first processing unit 41 in the implementation mode further executes at least one of:

when in an all cells unavailable state, stopping idle measurement, stopping the timer, and releasing the idle measurement configuration;

when in an all cells unavailable state, stopping idle measurement, stopping the timer, and releasing a measurement result;

when in an all cells unavailable state, stopping idle measurement, running or suspending the timer, and maintaining the measurement configuration and a measurement result;

when residing in an acceptable cell or residing in a cell, stopping idle measurement, stopping the timer, and releasing the idle measurement configuration;

when residing in an acceptable cell or residing in the cell, stopping idle measurement, stopping the timer, and releasing a measurement result; and when residing in an acceptable cell or residing in the cell, stopping idle measurement, running or suspending the timer, and maintaining the measurement configuration and a measurement result.

It can be seen that, with adoption of the solution, it may be determined whether to release a measurement configuration for an original frequency or not during cell reselection of the terminal device from an area to the second area. In such a manner, resource waste caused by releasing the whole idle measurement configuration every time when cell reselection is performed in a conventional art may be avoided, and reasonable and effective existence of a measurement configuration may be ensured.

Figure 6:
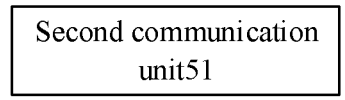
FIG. 6 is a composition structure diagram of a network device according to an embodiment of the disclosure.

Another implementation mode provides a network device, which, as shown in FIG. 6, includes a second communication unit 51.

The second communication unit 51 may configure an idle measurement configuration for a terminal device.

The idle measurement configuration may include a measurement configuration corresponding to at least one frequency. One or more frequencies in the at least one frequency may correspond to one validity area, and one or more validity areas may correspond to one timer.

The solution provided in the implementation mode is described in combination with multiple scenarios.

A First Scenario

The idle measurement configuration includes:

a measurement configuration corresponding to each frequency in the at least one frequency, and a validity area corresponding to each frequency in the at least one frequency.

At first, it is to be pointed out that, in the scenario, the second communication unit 51, when sending the all-cells measurement configuration, specifically may send the idle measurement configuration through a system broadcast or RRC dedicated signaling.

For example, a measurement configuration, configured for the terminal device through an RRC release message, in the idle state and/or the inactive state is called an idle measurement configuration.

Specifically, the idle measurement configuration includes measurement configurations for multiple frequencies. The measurement configuration corresponding to each frequency may include contents such as a frequency required to be measured, a measurement bandwidth, a validity area for the frequency, and a cell list reported by the measurement configuration.

For the idle measurement configuration, there may be two conditions. In the first condition, the idle measurement configuration may further include a global timer. In the second condition, the idle measurement configuration includes different timers for each frequency. The concept of the global timer or the timer for the frequency in the two conditions is the same as that described above, and elaborations thereof are omitted here.

A Second Scenario

In the scenario, the idle measurement configuration includes a global timer and a global validity area corresponding to the at least one frequency.

That is, the difference from the abovementioned scenario is that, in the scenario, a same global validity area is configured for all the frequencies, namely all the frequencies correspond to the same validity area, and a same timer is configured for all the frequencies. The timer can be understood as a global timer.

A manner for sending the idle measurement configuration is the same as that described above, and elaborations thereof are omitted here.

In the scenario, the acquired idle measurement configuration may also include the measurement configuration corresponding to each frequency in the multiple frequencies. However, the measurement configuration corresponding to each frequency does not include the validity area for the frequency, and instead, the same global validity area is sent in the idle measurement configuration. Moreover, each frequency has no corresponding timer, and instead, all the frequencies correspond to the global timer.

A Third Scenario

The idle measurement configuration includes a global timer and a group area corresponding to each frequency group in at least one frequency group.

The difference from between the scenario and the two abovementioned scenarios is that, in the scenario, processing is performed not by taking an independent frequency as a unit but by setting multiple frequencies as a frequency group. That is, multiple frequencies in the at least one frequency form a frequency group, and the group areas are set by taking a frequency group as a unit, namely each frequency group corresponds to a validity area. In addition, in the scenario, the same timer is adopted for all the frequencies, and the timer can also be understood as a global timer.

A manner for acquiring the idle measurement configuration is the same as that described above, and elaborations thereof are omitted here. However, specific contents in the idle measurement configuration are different. The idle measurement configuration includes a measurement configuration corresponding to each frequency and a group area for at least one frequency group, namely the frequency group shares the same validity area, and different frequencies correspond to different group areas. Here, being different may refer to that areas partially overlap or completely do not overlap.

In addition, the same timer, i.e., a global timer, is configured for all frequency groups.

A manner of dividing part of frequencies in the at least one frequency into the same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

A Fourth Scenario

The idle measurement configuration includes a group timer and a group area respectively corresponding to each frequency group in at least one frequency group.

Like the third scenario, processing for frequency groups is performed in the scenario. The difference from the third scenario is that, in the scenario, no global timer is used, and instead, a group timer is set for each frequency group. That is, each frequency in each frequency group corresponds to the same group timer. Different frequency groups correspond to different group timers. Time lengths of different group timers may be different or the same, or may partially the same or partially different. Exhaustions are omitted here.

A manner of dividing part of frequencies in the at least one frequency into the same frequency group may be dividing according to network types corresponding to the frequencies. For example, frequencies of the E-UTRAN are divided into a frequency group, and NR frequencies are divided into other frequency group. Of course, more frequency group division manners may be adopted, and will not be exhausted in the scenario.

It can be seen that, with adoption of the solution, at least the measurement configuration corresponding to the first frequency in the idle measurement configuration may be processed during cell reselection of the terminal device from an area to the second area. In such a manner, resource waste caused by releasing the whole idle measurement configuration every time when cell reselection is performed in a conventional art may be avoided, and reasonable and effective existence of a measurement configuration may be ensured.

Figure 7:
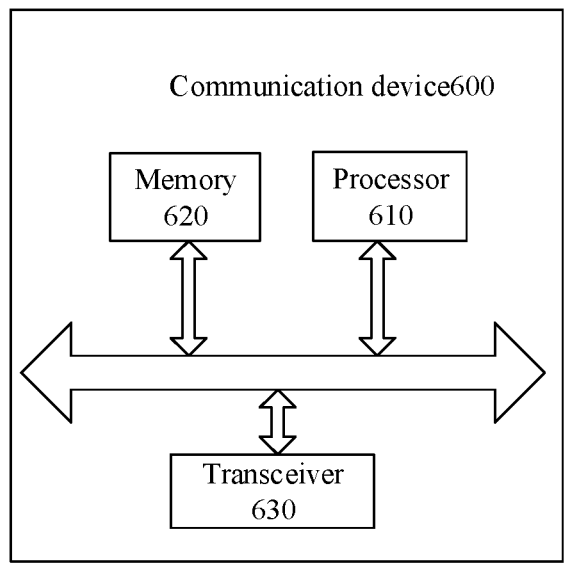
FIG. 7 is a composition structure diagram of a communication device according to an embodiment of the disclosure.

FIG. 7 is a schematic structure diagram of a communication device 600 according to an embodiment of the disclosure. The communication device may be the above-mentioned terminal device or network device of the embodiments. The communication device 600 shown in FIG. 7 includes a processor 610, and the processor 610 may call and run a computer program in a memory to implement the method in the embodiments of the disclosure.

Optionally, as shown in FIG. 7, the communication device 600 may further include the memory 620. The processor 610 may call and run the computer program in the memory 620 to implement the method in the embodiments of the disclosure.

The memory 620 may be an independent device independent of the processor 610 and may also be integrated into the processor 610.

Optionally, as shown in FIG. 7, the communication device 600 may further include a transceiver 630, and the processor 610 may control the transceiver 630 to communicate with other device, specifically sending information or data to the other device or receiving information or data sent by the other device.

The transceiver 630 may include a transmitter and a receiver. The transceiver 630 may further include antennae, and the number of the antennae may be one or more.

Optionally, the communication device 600 may specifically be the network device of the embodiments of the disclosure, and the communication device 600 may implement corresponding flows implemented by the network device in each method of the embodiments of the disclosure. For simplicity, elaborations are omitted herein.

Optionally, the communication device 600 may specifically be a terminal device or network device of the embodiment of the disclosure, and the communication device 600 may implement corresponding flows implemented by the mobile terminal/terminal device in each method of the embodiments of the disclosure. For simplicity, elaborations are omitted herein.

Figure 8:
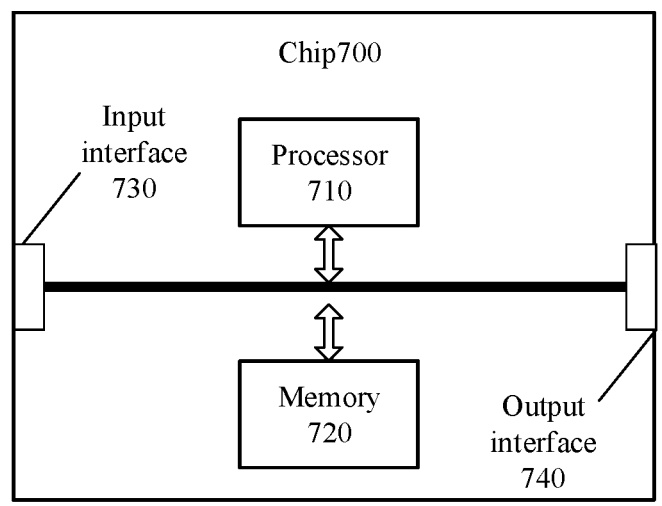
FIG. 8 is a schematic block diagram of a chip according to an embodiment of the disclosure.

FIG. 8 is a schematic structure diagram of a chip according to another embodiment of the disclosure. The chip 700 shown in FIG. 8 includes a processor 710, and the processor 710 may call and run a computer program in a memory to implement the method in the embodiments of the disclosure.

Optionally, as shown in FIG. 8, the chip 700 may further include the memory 720. The processor 710 may call and run the computer program in the memory 720 to implement the method in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with the other device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 9:
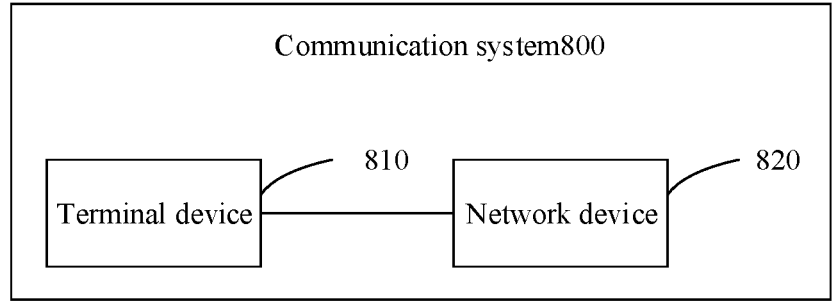
FIG. 9 is a second schematic diagram of an architecture of a communication system according to an embodiment of the disclosure.

FIG. 9 is a second block diagram of a communication system 800 according to an embodiment of the disclosure.

As shown in FIG. 9, a communication system 800 includes a terminal device 810 and a network device 820.

The terminal device 810 may be configured to realize corresponding functions realized by the terminal device in the method, and the network device 820 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor, etc. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM), or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be implemented by a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the terminal device in each method of the embodiments of the disclosure. For simplicity, elaborations are omitted herein.

The embodiments of the disclosure also provide a computer program product, which includes a computer program instruction.

Optionally, the computer program product may be implemented by a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be implemented by a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be implemented by a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purposes of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A measurement configuration processing method, implemented by a terminal device in an idle state or an active state, the method comprising:
performing cell reselection from a first area where a first frequency is located to a second area; and
processing at least a measurement configuration for the first frequency in an idle measurement configuration,
wherein the idle measurement configuration comprises: a timer corresponding to a plurality of frequencies, and a group area corresponding to each frequency group in at least one frequency group, wherein at least two frequencies among the plurality of frequencies correspond to one validity area, and one or more than one validity area corresponds to one timer, the first frequency being one of the at least two frequencies among the plurality of frequencies,
wherein processing at least the measurement configuration for the first frequency in the idle measurement configuration comprises:
stopping the timer corresponding to the plurality of frequencies, and releasing measurement configurations corresponding to all frequency groups in the idle measurement configuration; or
stopping measurement of a frequency group where the first frequency is located, releasing a measurement configuration corresponding to the frequency group where the first frequency is located, and maintaining a measurement configuration corresponding to other frequency group than the frequency group where the first frequency is located; or
stopping measurement of a frequency group where the first frequency is located, maintaining a measurement configuration corresponding to the frequency group where the first frequency is located, and keeping running the timer corresponding to the plurality of frequencies; or
stopping measurement of a frequency group where the first frequency is located, maintaining a measurement configuration corresponding to the frequency group where the first frequency is located, and suspending the timer corresponding to the plurality of frequencies,
wherein after stopping measurement of the frequency group where the first frequency is located, maintaining the measurement configuration for the frequency group where the first frequency is located and keeping running the timer corresponding to the plurality of frequencies, the method further comprising:
in response to reentering a group area of the frequency group where the first frequency is located before the timer corresponding to the plurality of frequencies expires, performing measurement using the measurement configuration for the frequency group where the first frequency is located.

2. The method of claim 1, after stopping measurement of the frequency group where the first frequency is located, maintaining the measurement configuration for the frequency group where the first frequency is located and suspending the timer corresponding to the plurality of frequencies, the method further comprising:
reentering the group area of the frequency group where the first frequency is located, performing measurement using the measurement configuration for the frequency group where the first frequency is located, and continuing running the timer corresponding to the plurality of frequencies.

3. The method of claim 1, wherein the idle measurement configuration comprises a group timer.

4. The method of claim 3, wherein processing at least the measurement configuration for the first frequency in the idle measurement configuration further comprises:
stopping a first group timer of the frequency group where the first frequency is located, and releasing the measurement configuration for the frequency group where the first frequency is located; or
stopping the measurement of the frequency group where the first frequency is located, maintaining the measurement configuration for the frequency group where the first frequency is located, and keeping running a first group timer of the frequency group where the first frequency is located; or
stopping the measurement of the frequency group where the first frequency is located, maintaining the measurement configuration for the frequency group where the first frequency is located, and suspending a first group timer of the frequency group where the first frequency is located.

5. The method of claim 4, after stopping measurement of the frequency group where the first frequency is located, maintaining the measurement configuration for the frequency group where the first frequency is located and keeping running the first group timer of the frequency group where the first frequency is located, the method further comprising:
  reentering the group area of the frequency group where the first frequency is located before the first group timer of the frequency group where the first frequency is located expires, and performing the measurement using the measurement configuration for the frequency group where the first frequency is located.

6. The method of claim 4, after stopping measurement of the frequency group where the first frequency is located, maintaining the measurement configuration for the frequency group where the first frequency is located and suspending the first group timer of the frequency group where the first frequency is located, the method further comprising:
  reentering the group area of the frequency group where the first frequency is located, performing the measurement using the measurement configuration for the frequency group where the first frequency is located, and continuing running the first group timer of the frequency group where the first frequency is located.

7. The method of claim 1, further comprising at least one of:
  when in an all cells unavailable state, stopping idle measurement, stopping the timer, and releasing the idle measurement configuration;
  when in an all cells unavailable state, stopping idle measurement, stopping the timer, and releasing a measurement result;
  when in an all cells unavailable state, stopping idle measurement, running or suspending the timer, and maintaining the measurement configuration and a measurement result;
  when residing in an acceptable cell or residing in a cell, stopping idle measurement, stopping the timer, and releasing the idle measurement configuration;
  when residing in an acceptable cell or residing in a cell, stopping idle measurement, stopping the timer, and releasing a measurement result; and
  when residing in an acceptable cell or residing in a cell, stopping idle measurement, running or suspending the timer, and maintaining the measurement configuration and a measurement result.

8. A measurement configuration processing method, implemented by a network device and comprising:
  configuring an idle measurement configuration for a terminal device, in response to the terminal device performing cell reselection from a first area where a first frequency is located to a second area,
  wherein the idle measurement configuration comprises: a timer corresponding to a plurality of frequencies, and a group area corresponding to each frequency group in at least one frequency group, wherein at least two frequencies among the plurality of frequencies correspond to one validity area, and one or more than one validity area corresponds to one timer, the first frequency being one of the at least two frequencies among the plurality of frequencies,
  wherein the idle measurement configuration is for the terminal device to perform one of following operations:
  stopping the timer corresponding to the plurality of frequencies, and releasing measurement configurations corresponding to all frequency groups in the idle measurement configuration; or
  stopping measurement of a frequency group where the first frequency is located, releasing a measurement configuration corresponding to the frequency group where the first frequency is located, and maintaining a measurement configuration corresponding to other frequency group than the frequency group where the first frequency is located; or
  stopping measurement of a frequency group where the first frequency is located, maintaining a measurement configuration corresponding to the frequency group where the first frequency is located, and keeping running the timer corresponding to the plurality of frequencies; or
  stopping measurement of a frequency group where the first frequency is located, maintaining a measurement configuration corresponding to the frequency group where the first frequency is located, and suspending the timer corresponding to the plurality of frequencies,
  wherein after stopping measurement of the frequency group where the first frequency is located, maintaining the measurement configuration for the frequency group where the first frequency is located and keeping running the timer corresponding to the plurality of frequencies, the method further comprising:
  in response to reentering a group area of the frequency group where the first frequency is located before the timer corresponding to the plurality of frequencies expires, performing measurement using the measurement configuration for the frequency group where the first frequency is located.

9. The method of claim 8, wherein the idle measurement configuration comprises a group timer.

10. A terminal device, comprising a processor and a memory configured to store a computer program capable of running in the processor,
  wherein the terminal device is configured to perform cell reselection from a first area where a first frequency is located to a second area and process at least a measurement configuration for the first frequency in an idle measurement configuration,
  wherein the idle measurement configuration comprises: a timer corresponding to a plurality of frequencies, and a group area corresponding to each frequency group in at least one frequency group, wherein at least two frequencies among the plurality of frequencies correspond to one validity area, and one or more than one validity area corresponds to one timer, the first frequency being one of the at least two frequencies among the plurality of frequencies,
  the terminal device is configured to process at least the measurement configuration for the first frequency in an idle measurement configuration by performing one of following operations:
  stopping the timer corresponding to the plurality of frequencies, and releasing measurement configurations corresponding to all frequency groups in the idle measurement configuration; or
  stopping measurement of a frequency group where the first frequency is located, releasing a measurement configuration corresponding to the frequency group where the first frequency is located, and maintaining a measurement configuration corresponding to other frequency group than the frequency group where the first frequency is located; or
  stopping measurement of a frequency group where the first frequency is located, maintaining a measurement configuration corresponding to the frequency group where the first frequency is located, and keeping running the timer corresponding to the plurality of frequencies; or stopping measurement of a frequency group where the first frequency is located, maintaining a measurement configuration corresponding to the frequency group where the first frequency is located, and suspending the timer corresponding to the plurality of frequencies, wherein after stopping measurement of the frequency group where the first frequency is located, maintaining the measurement configuration for the frequency group where the first frequency is located and keeping running the timer corresponding to the plurality of frequencies, the terminal device is further configured to:

in response to reentering a group area of the frequency group where the first frequency is located before the timer corresponding to the plurality of frequencies expires, perform measurement using the measurement configuration for the frequency group where the first frequency is located.

11. The terminal device of claim 10, wherein after stopping measurement of the frequency group where the first frequency is located, maintaining the measurement configuration for the frequency group where the first frequency is located and suspending the timer corresponding to the plurality of frequencies, the terminal device is configured to:

reenter the group area of the frequency group where the first frequency is located, perform the measurement using the measurement configuration for the frequency group where the first frequency is located, and continue running the timer corresponding to the plurality of frequencies.

12. The terminal device of claim 10, wherein the idle measurement configuration comprises a group timer.

13. The terminal device of claim 12, wherein the terminal device is further configured to:

stop a first group timer of the frequency group where the first frequency is located, and release the measurement configuration for the frequency group where the first frequency is located; or stop the measurement of the frequency group where the first frequency is located, maintain the measurement configuration for the frequency group where the first frequency is located, and keep running a first group timer of the frequency group where the first frequency is located; or stop the measurement of the frequency group where the first frequency is located, maintain the measurement configuration for the frequency group where the first frequency is located, and suspend a first group timer of the frequency group where the first frequency is located.

14. The terminal device of claim 13, wherein after stopping measurement of the frequency group where the first frequency is located, maintaining the measurement configuration for the frequency group where the first frequency is located and keeping running the first group timer of the frequency group where the first frequency is located, the terminal device is further configured to:

reenter the group area of the frequency group where the first frequency is located before the first group timer of the frequency group where the first frequency is located expires, and perform the measurement using the measurement configuration for the frequency group where the first frequency is located.

15. The terminal device of claim 13, wherein after stopping measurement of the frequency group where the first frequency is located, maintaining the measurement configuration for the frequency group where the first frequency is located and suspending the first group timer of the frequency group where the first frequency is located, the terminal device is further configured to:

reenter the group area of the frequency group where the first frequency is located, perform the measurement using the measurement configuration for the frequency group where the first frequency is located, and continue running the first group timer of the frequency group where the first frequency is located.

16. The terminal device of claim 10, wherein the terminal device is further configured to:

when in an all cells unavailable state, stop idle measurement, stopping the timer, and release the idle measurement configuration;

when in an all cells unavailable state, stop idle measurement, stop the timer, and release a measurement result;

when in an all cells unavailable state, stop idle measurement, run or suspending the timer, and maintain the measurement configuration and a measurement result;

when residing in an acceptable cell or residing in a cell, stop idle measurement, stop the timer, and release the idle measurement configuration;

when residing in an acceptable cell or residing in a cell, stop idle measurement, stop the timer, and release a measurement result; and when residing in an acceptable cell or residing in a cell, stop idle measurement, run or suspend the timer, and maintain the measurement configuration and a measurement result.

17. A network device, comprising a processor and a memory configured to store a computer program capable of running in the processor, wherein the network device is configured to call and run the computer program stored in the memory to execute the steps of the method of claim 8, wherein the idle measurement configuration comprises: a timer corresponding to a plurality of frequencies, and a group area corresponding to each frequency group in at least one frequency group, wherein at least two frequencies among the plurality of frequencies correspond to one validity area, and one or more than one validity area corresponds to one timer, the first frequency being one of the at least two frequencies among the plurality of frequencies.

18. A non-transitory computer-readable storage medium, storing a computer program, the computer program causing a computer to execute the steps of the method of claim 1, wherein the idle measurement configuration comprises: a timer corresponding to a plurality of frequencies, and a group area corresponding to each frequency group in at least one frequency group, wherein at least two frequencies among the plurality of frequencies correspond to one validity area, and one or more than one validity area corresponds to one timer, the first frequency being one of the at least two frequencies among the plurality of frequencies.

* * * * *